Figure 1:
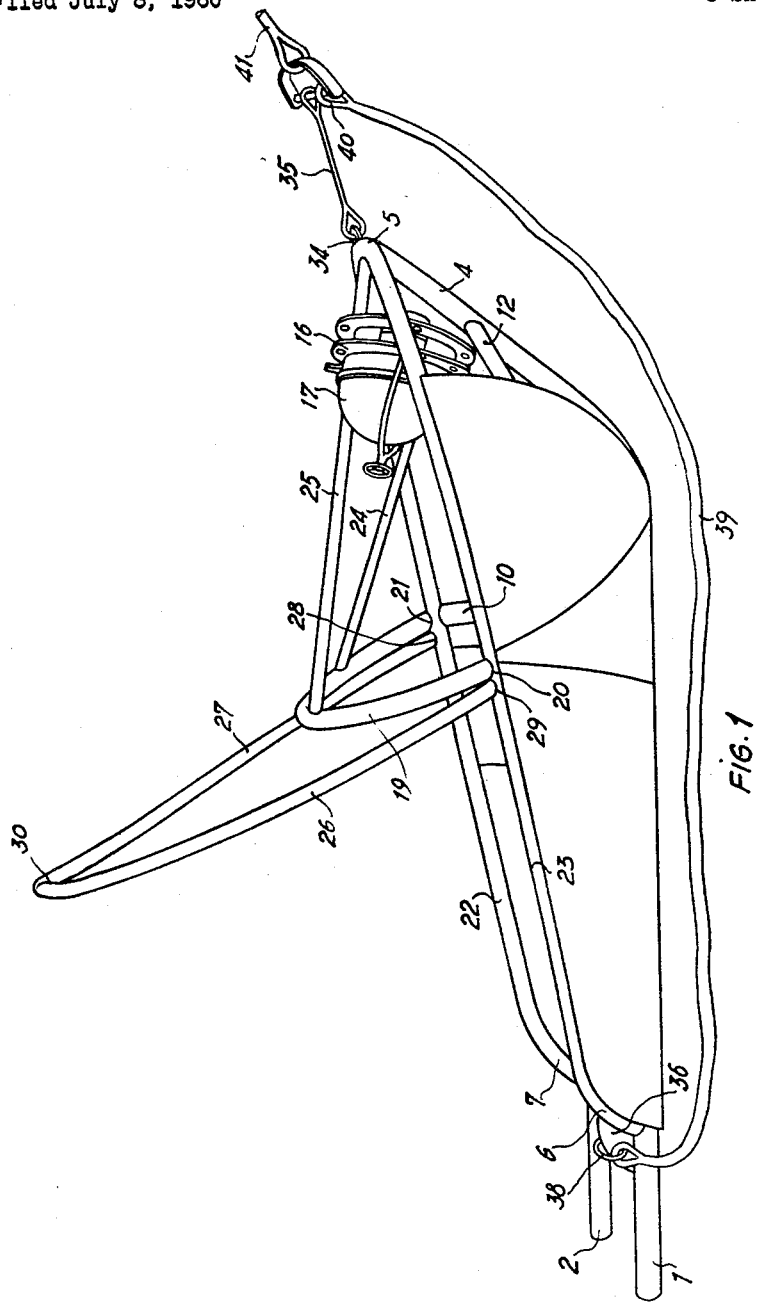

United States Patent Office 3,082,731
Patented Mar. 26, 1963

3,082,731
TOWED VEHICLE FOR SUBMARINE SUBMERSION
Jacques Yves Cousteau, Paris, France, Emile Gagnan, Montreal, Quebec, Canada, and André Laban and Jean Mollard, Marseilles, France, assignors to La Spirotechnique
Filed July 8, 1960, Ser. No. 41,675
Claims priority, application France July 22, 1959
6 Claims. (Cl. 114—235)

The present invention relates to a towed vehicle for submarine submersion, designed more especially to serve as a measuring station, observation station or as a station for making cinematographic films of sea beds, for example of the Continental Shelf, with a view to establishing its physical appearance or its geological nature. It has already been proposed to solve this problem by attaching a photographic or cinematographic apparatus to a cable fixed to a moving ship, but the pictures obtained by this means are of inferior quality, because the distance of the camera from the sea bed continuously varies, owing to the movements imparted to the ship by the waves and transmitted to the camera, so that the pictures lack sharpness and they can only be interpreted with a certain degree of approximation.

The object of the invention is to resolve this problem with a better result. It relates to a towed vehicle for submarine exploration, intended more particularly to serve as an observation station, measuring station or a station for taking photographic or cinematographic pictures, formed by a sledge adapted to slide on the sea bed and comprising at least one means for attaching a towing cable arranged so as to cause it to advance in crab-like fashion, that is to say, obliquely on one side, and is characterized in that it comprises at least one supplementary point of attachment to the towing vehicle, the said point being separate from the first mentioned attachment point or points and disposed to the rear of the centre of gravity of the sledge, preferably in the vicinity of the rear portion of one of its runners, the cable leading from this additional attachment point being sufficiently strong to resist heavy pulling forces, whereas the cable leading from the front attachment point to the towing vehicle is less resistant and is adapted to snap when the sledge is stopped by an obstruction, the sledge preferably being surmounted by an arch-like member formed for example by means of two tubes welded to the sides of the sledge and to one another at their upper ends, the fixing of the tubes to the sledge and to one another being preferably effected by weld beads of low resistance.

During its displacement on the sea bed, it can happen that the sledge will meet an obstruction, for example a rock, it being possible for the front part of the sledge to become jammed in the rough wall thereof. Too strong a pull on the towing cable in an attempt to disengage the sledge could lead to the cable breaking and the sledge and its equipment being lost. However, with the arrangement of the invention, if the sledge becomes fast and the first cable breaks, the pulling force is exerted on the second cable and, in view of the point of attachment of this second cable, this pulling force causes the sledge to pivot, rock laterally or be turned completely upside down, depending on the shape of the obstruction or the manner in which the sledge is held by the latter. In order that one or other of these movements may not lead to damage of the sledge and its photographic equipment, it is proposed according to the invention to make the sides of the sledge from curved sheet metal plates and to arrange above these sides an arcuate tube and possibly a relatively tall arch-like member formed by two tubes disposed in a transverse plane inclined towards the rear of the sledge, each of these tubes being welded to one wall of the sledge, and the upper ends thereof being welded together by a welding bead capable of being ruptured, so as not to form an obstacle to the forward movement of the sledge, which will have overturned after the first towing cable breaks, as indicated above.

One embodiment of the invention will now be described by reference to the accompanying drawing, given by way of example.

Figure 2:
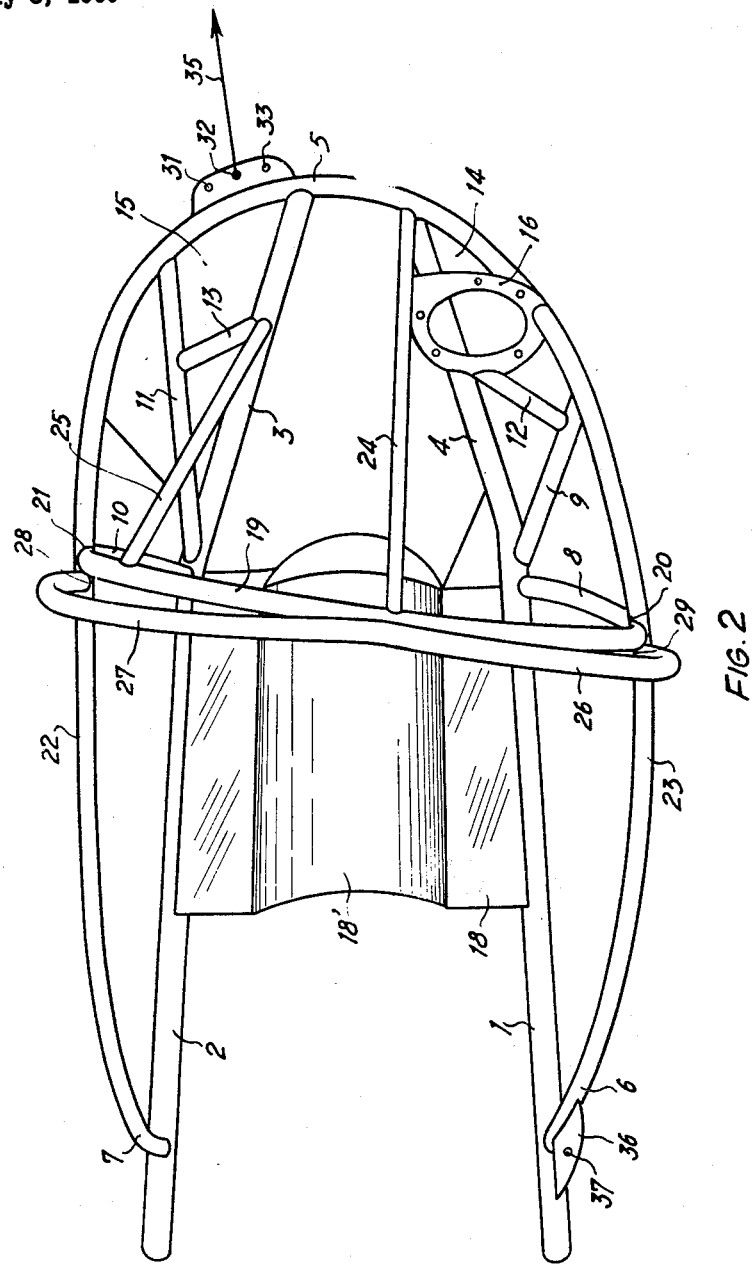
Figure 3:
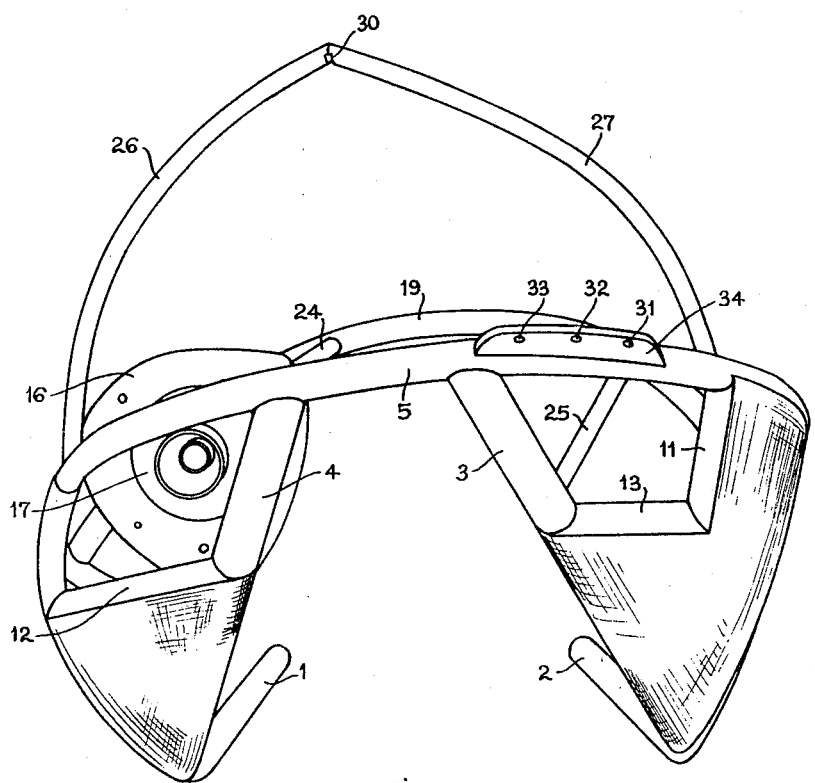

FIGURE 1 is a side elevation of the vehicle according to the invention.
FIGURE 2 is a plan view thereof, and
FIGURE 3 is an end view.

As shown in the drawing, the vehicle or sledge is formed by a tubular frame comprising, serving as runners, two tubes 1 and 2, the front parts 3 and 4 of which are bent upwardly and turned slightly towards one another. These tubes 1, 4 and 2, 3 are assembled by means of a tube 5 bent to U-shape, the end portions 6 and 7 thereof being bent downwardly. Bracing members 8, 9 and 10, 11, also formed by tubular sections, are welded between the runners 1, 2 and the lateral arms of the U-shaped tube, and the rigidity of the frame is completed by bracing members 12, 13 welded between the bracing members 9 and 11 and the raised portions 3 and 4 of the runners.

The width of the U-shaped tube 5 is greater than the distance between the two runners 1 and 2, and the bracing members 8 and 10 are curved. The sides of the sledge frame are completed by curved sheet metal plates (see FIGURES 1 and 3) which leave two openings 14 and 15 at the front (FIGURE 3). The first of these openings (14) is defined by the front part of the U-shaped tube, by the front part 4 of the runner 1 and by the bracing member 12. This opening forms a viewing window, at the rear of which is fixed a plate 16 on which can be bolted a liquid-tight box 17 containing a photographic apparatus. The second (15) of these openings, which is defined by the front part of the U-shaped tube, by the front part 3 of the runner 2 and by the bracing member 13, forms a window, behind which can be arranged by any suitable means a light source for illuminating the sea bed in order to facilitate the photographic exposure. The walling of the sledge is completed by a sheet metal base 18, welded between the runners 1 and 2 and between their raised portions 3 and 4, the mean longitudinal portion of the base being curved upwardly so as to form a longitudinal channel 18' capable of preventing the sledge from sticking to the muddy sea bottom.

In addition to the various bracing members which have just been described and which connect the two arms of the U-shaped tube to other tubular sections, the sledge carries in the upper part thereof an arcuate tube 19 welded at 20 and 21 to the two arms 22 and 23 of the U-shaped tube and reinforced by two tubes 24 and 25 constituting struts; the first of these tubes is welded between the tube 19 and the fore end 3 of a runner and the second is welded between the tube 19 and the U-shaped tube 5; the two struts 24 and 25 are inclined rearwardly and upwardly and the tube 19 is disposed in a transverse plane inclined relatively to the vertical plane perpendicular to the rear portions of the runners 1 and 2. Finally, welded to the two arms 22 and 23 of the U-shaped tube 5 and behind the acruate tube 19 is an arch-like member formed by means of two tubes 26 and 27, welded at 28 and 29 to the said arms and welded to one another at 30. The arch is advantageously disposed in a plane inclined towards the rear of the sledge and substantially parallel to that containing the tube 19, but the top of the arch is preferably inclined slightly towards the front of the sledge.

The sledge is adapted to be driven from a ship by means of the cable connecting it to the latter. According to the invention, the sledge comprises means enabling it to advance obliquely, in the manner of a crab. To this end, the point of attachment between the front of the sledge and the ship is displaced laterally with respect to the mean longitudinal axis of the sledge. This point of attachment is formed by one of the three holes 31, 32, 33 formed in a plate 34 welded on the side of the base of the U-shaped tube, this plate being disposed on the side opposite to the photographic or cinematographic camera 17 with respect to the mean longitudinal plane of the sledge.

Because of this arrangement, when the towing cable 35 leading to the towing ship becomes taut, the sledge pivots about its centre of gravity (preferably provided at a third of its length, starting from the base of the U-shaped tube) through an angle such that its centre of gravity becomes situated approximately in the extension of the towing cable 35 and it advances obliquely, the arm 22 being ahead of the arm 23. Due to this fact, the photographic camera is removed from the zone in which mud can be stirred up by the towing cable. A double advantage results from the arrangement of the sledge. On the one hand, while the sledge is sliding along the sea bed, the photographic or cinematographic camera is at a constant distance from this bed, which it can record with a high degree of sharpness. On the other hand, because the camera is removed from the zone which can be disturbed by the muddy bottom which would be stirred up by the sledge and the cable, the pictures which are taken are quite clear.

In addition to the front attachment or anchoring point 32 (or 31, 33), the sledge comprises a second anchoring point disposed at the rear and formed by a plate 36 welded to the runner 1 and to the descending section 6 of the arm 23 of the U-shaped tube 5 and formed with a hole 37. Fixed in this hole, for example by means of a thimble 38, is a thick cable 39 connected at 40 to a shackle carried at the end of the cable 41 leading from the ship. Connected to the same shackle is the cable 35 connected at 32 to the front of the sledge, this cable 35 being thinner than the cable 39.

When operating normally, the pulling force of the cable 41 is transmitted simply by the cable 35 to the sledge, the cable 39 trailing in the water. If the sledge meets an obstruction, for example if the front part thereof lodges in the cavity of a rock and if simple manoeuvring of the ship does not enable it to be released, a pulling force is exerted on the cable 35 which is greater than it can withstand, and this breaks the cable. At this moment, it is the cable 39 which becomes the towing cable and, by pulling on this latter, it is possible either to cause the sledge to swivel laterally in order to release it or even to turn it completely over. This latter operation is made easier by the provision of the arch. Actually, when the sledge is turned over, the top of this arch can bear against the wall of the rock and it forms a bearing point which enables the swinging movement to occur more easily as the top of the arch member is disposed well above the sledge. In order to prevent this arch from forming an additional point by which the sledge is anchored to the rock, the weld beads 28, 29 and 30 are relatively weak.

In order to facilitate the crab-like movement and in order to improve the conditions for photography, the mean longitudinal plane of the sledge is not a plane of symmetry, as can be seen in FIGURE 3, in which the sheet metal base 18 and its front extension filling the space between the two tubular sections 3 and 4 have been omtited. In actual fact, the side comprising the attachment points 31, 32, 33 is higher than the side in which the photographic or cinematographic camera is disposed. This is achieved by arranging the U-shaped tube 5 in an oblique plane inclined downwardly and towards the rear attachment point 37. By virtue of this arrangement, the crab-like movement of the sledge is quite stable and the camera is closer to the sea bed.

Finally, the sledge comprises one or more benches (not shown), on which can be rigidly fixed a certain number of devices, for example those necessary for supplying a light source and for the current supply to the electric motor of the camera.

What we claim is:

1. In combination, a towed vehicle for submarine exploration comprising a sledge adapted to slide obliquely on one side along the sea bed, and a towing cable means for said sledge; said towing cable means being non-symmetrically attached to said sledge in normal running of said sledge primarily by a fixed frangible first cable means adapted to snap at a predetermined load when said sledge is stopped by an obstruction, said towing cable means being secondarily attached to said sledge by a second cable means, said second cable means being sufficiently long so as to remain slack during normal running of the sledge and being substantially stronger than said first cable means.

2. The combination of claim 1, in which said second cable means is attached to a point on the sledge disposed at the rear of the centre of gravity of the latter.

3. The combination of claim 1, comprising an archlike member surmounting the sledge and means for securing said member respectively to the sides of the sledge, and said means being adapted to break when said archlike member is submitted to strains greater than those occurring during the normal running of the sledge.

4. The combination of claim 3, in which the archlike member is formed by two tubes secured respectively to the sides of the sledge, said tubes being directly secured to one another at their ends remote from the sides of the sledge by a weld bead substantially weaker than the tubes proper.

5. The combination of claim 3, in which the archlike member is secured to the sledge between the centre of gravity of the latter and the attachment point for said second cable means.

6. The combination of claim 3, in which said archlike member is disposed in an oblique plane relatively to a plane containing the rear portion of the sledge runners.

References Cited in the file of this patent

UNITED STATES PATENTS

| 365,392 | Lee | June 28, 1887 |
| 2,635,926 | Michalowski | Apr. 21, 1953 |
| 2,796,844 | March | June 25, 1957 |

FOREIGN PATENTS

| 190,387 | Great Britain | Dec. 21, 1922 |
| 161,107 | Sweden | Oct. 27, 1957 |